(12) United States Patent
Muir, Jr. et al.

(10) Patent No.: US 6,767,604 B2
(45) Date of Patent: Jul. 27, 2004

(54) PACKAGE WITH ATTACHED RESEALABLE COVER AND METHOD OF MAKING SAME

(75) Inventors: William W. Muir, Jr., Grand Rapids, MI (US); Frank G. deBruin, Grand Rapids, MI (US)

(73) Assignee: Grand Rapids Label Company, Grand Rapids, MI (US)

( * ) Notice: Subject to any disclaimer, the term of this patent is extended or adjusted under 35 U.S.C. 154(b) by 0 days.

(21) Appl. No.: 10/063,999

(22) Filed: Jun. 3, 2002

(65) Prior Publication Data

US 2002/0182359 A1 Dec. 5, 2002

Related U.S. Application Data

(60) Provisional application No. 60/295,650, filed on Jun. 4, 2001.

(51) Int. Cl.[7] ................................................. B32B 3/00
(52) U.S. Cl. ....................... 428/40.1; 206/233; 206/494; 206/816; 221/45; 221/64; 428/41.8; 428/41.9; 428/41.2; 428/43; 428/138; 428/192; 428/194
(58) Field of Search ................................ 428/40.1, 41.8, 428/41.9, 41.2, 43, 138, 192, 194, 131, 42.2; 206/233, 494, 816; 221/45, 64; 383/5, 210, 211, 98, 99

(56) References Cited

U.S. PATENT DOCUMENTS

| | | | |
|---|---|---|---|
| 4,128,954 A | 12/1978 | White | |
| 4,771,891 A | 9/1988 | Sorensen et al. | |
| 4,840,270 A * | 6/1989 | Caputo | 220/258 |
| 4,889,234 A | 12/1989 | Sorensen et al. | |
| 5,264,265 A | 11/1993 | Kaufmann | |
| 5,284,363 A | 2/1994 | Gartner et al. | |
| 5,379,897 A * | 1/1995 | Muckenfuhs | 206/494 |
| 5,704,649 A | 1/1998 | Small | |
| 6,000,726 A | 12/1999 | Campbell | |
| 6,026,953 A * | 2/2000 | Nakamura | 206/233 |
| 6,113,271 A * | 9/2000 | Scott | 383/211 |

* cited by examiner

*Primary Examiner*—Nasser Ahmad
(74) *Attorney, Agent, or Firm*—McGarry Bair PC

(57) ABSTRACT

A flexible package has a dispensing opening with a closure label overlying the opening that is permanently attached to the package by heat sealing along an edge portion adjacent the dispensing opening. The label has a releasable adhesive on the underside of the remaining portion for selectively opening and resealing the dispensing opening. The package is formed from a film that is partially die cut to form the dispensing opening. The label with the releasable adhesive is then applied to the package over the dispensing opening and heat sealed along an edge portion of the film. The film and attached label are later folded to form an envelope, filled with dispensable product, and heat sealed to encapsulate the product. The label can be selectively opened and resealed to enable access to the product through the dispensing opening. Complete removal of the label is prevented by the heat-sealed edge portion.

10 Claims, 5 Drawing Sheets

PACKAGE WITH ATTACHED RESEALABLE COVER AND METHOD OF MAKING SAME

CROSS REFERENCE TO RELATED APPLICATIONS

This application claims the benefit of U.S. provisional application Ser. No. 60/295,650, filed Jun. 4, 2001.

BACKGROUND OF INVENTION

1. Field of the Invention

This invention relates to resealable packages. In one aspect, the invention relates to a package with a dispensing opening and a resealable cover which is permanently sealed in part to the package and has a releasable adhesive on an underside for selectively securing the resealable cover over the dispensing opening. In another of its aspects, the invention relates to a package with a dispensing opening and a resealable, tamper-evident cover. In yet another of its aspects, the invention relates to a laminate film web comprising a plurality of regularly-spaced, partially die-cut openings each having a permanently attached, resealable cover over the opening. In yet another of its aspects, the invention relates to a method for manufacturing a package from a laminate film web having a dispensing opening and a resealable cover

2. Description of the Related Art

Flexible tubular packages such as for disposable cleansing cloths have a resealable label for closing a dispensing opening in the package. The package is manufactured from an elongated thin film that is folded and sealed along its length, cut to lengths, filled and sealed along its edges to create the package. The label is affixed to the package over the dispensing opening and may include a generally transverse die-cut line that extends partially across the label and retards the removal of the label from the package when the label is peeled back from the opening. Notwithstanding the die cut, the label can be completely removed from the package. The label has a releasable adhesive on its underside for selectively opening and resealing the dispensing opening.

The label may be more securely attached to the package along one portion of the label through the use of a more secure adhesive with a line separating the more secure adhesive from the releasable adhesive serving as a hinge. The releasable adhesive may comprise a more permanent adhesive with a releasable coating or a more permanent adhesive in a pattern that provides for release of the label. In either case, the use of multiple coatings necessitates at least a two-step adhesive application process unless the removable portion is screened. Even though the adhesive may be considered as "permanent," it typically is removable if enough force is applied. If a releasable adhesive is utilized for the entire label, the user can unintentionally remove the entire label from the package.

U.S. Pat. No. 4,889,234 to Sorenson et al. and U.S. Pat. No. 4,771,891 to Sorenson et al. disclose a product box with a U-shaped perforation forming a pouring flap and a label permanently adhered to the box and to the flap. A single "permanent" adhesive is applied to the label in differing patterns. The adhesive pattern determines whether the label is more permanently or removably attached to the box. A fine pattern of more permanent adhesive around the perimeter of the flap enables the flap to be selectively removed and resealed.

U.S. Pat. No. 6,000,726 to Campbell and U.S. Pat. No. 5,284,363 to Gartner disclose labels that are attached to a substrate through the use of a "permanent" adhesive along one portion of the label and releasably attached to the substrate through the use of a releasable adhesive on the remainder of the label.

U.S. Pat. No. 4,128,954 to White discloses a label which is attached to a container by a thermosensitive adhesive along one portion of the label and provided with a second adhesive for attaching a separable portion of the label to another surface.

In packages where sterile contents are important, tamper-evident packages are important. In packages that have a resealable cover or label over a dispensing opening, it is desirable that a tamper-evident label indicate to the purchaser if the resealable cover has been peeled back and resealed.

SUMMARY OF INVENTION

According to the invention, a flexible package has a dispensing opening with a closure label overlying the opening that is permanently attached to the package, preferably by heat sealing, along an edge portion adjacent the dispensing opening.

The label is provided with a releasable adhesive on the underside of the remaining portion for selectively opening and resealing the dispensing opening.

The package is formed from a film that is first at least partially die cut to weaken the film and eventually form the dispensing opening. The label with a releasable adhesive is then applied to the package over the dispensing opening and heat sealed along an edge portion to the film. The film and attached label are later folded to form an envelope, filled with product, and heat sealed to encapsulate the product. The label can be selectively opened and resealed to enable access to the product through the dispensing opening. Complete removal of the label is prevented by the heat-sealed edge.

In one embodiment of the invention, the label further has a pull tab without adhesive at a peel end portion of the label distal from the heat sealed edge portion to facilitate peeling back the label from the film to expose the dispensing opening.

Preferably, the pull tab has a perforation or other weakened portion that divides the pull tab into a pull portion adjacent the peel end portion of the label and a tamper-evident portion remote from the peel end portion of the label. The tamper-evident portion of the pull tab is more permanently attached to the film and separates from the pull portion when the peel end portion of the label is first peeled back from the film.

In one embodiment, the package is made from a a continuous web with multiple at least partially die-cut openings and one of the labels is attached to the continuous web adjacent to each of the at least partially die-cut openings for alternatively covering and uncovering the at least partially die-cut openings.

Further according to the invention, a method of making a package with a dispensing opening and a label for selectively covering and uncovering the dispensing opening, comprising the steps of:

at least partially forming the dispensing opening in a thin film;

applying a label with a releasable adhesive over the dispensing opening in the film;

and heat sealing, or otherwise permanently affixing, the label along one edge to the film adjacent to the at least partially formed dispensing opening.

The method further comprises the step of forming the thin film into a package.

DETAILED DESCRIPTION

The invention described herein comprises a package formed in part from a film having an opening therethrough which is removably covered by a cover label which is permanently attached to the film adjacent to the opening along a first edge, preferably by heat sealing, to form a hinge at one end of the cover label. The cover label further has a releasable adhesive on an underside thereof for contacting the film and releasably securing the cover to the film over the opening. The cover label can be selectively peeled back from the opening and resealed over the opening to alternately cover and uncover the opening. In one embodiment, the film is formed into a tubular package that is heat sealed at the ends thereof. In another embodiment, the film comprises a web having a plurality of openings partially die cut therethrough and a cover label covers each opening. The cover labels can be applied prior to or after forming the film into the package.

Figure 1:
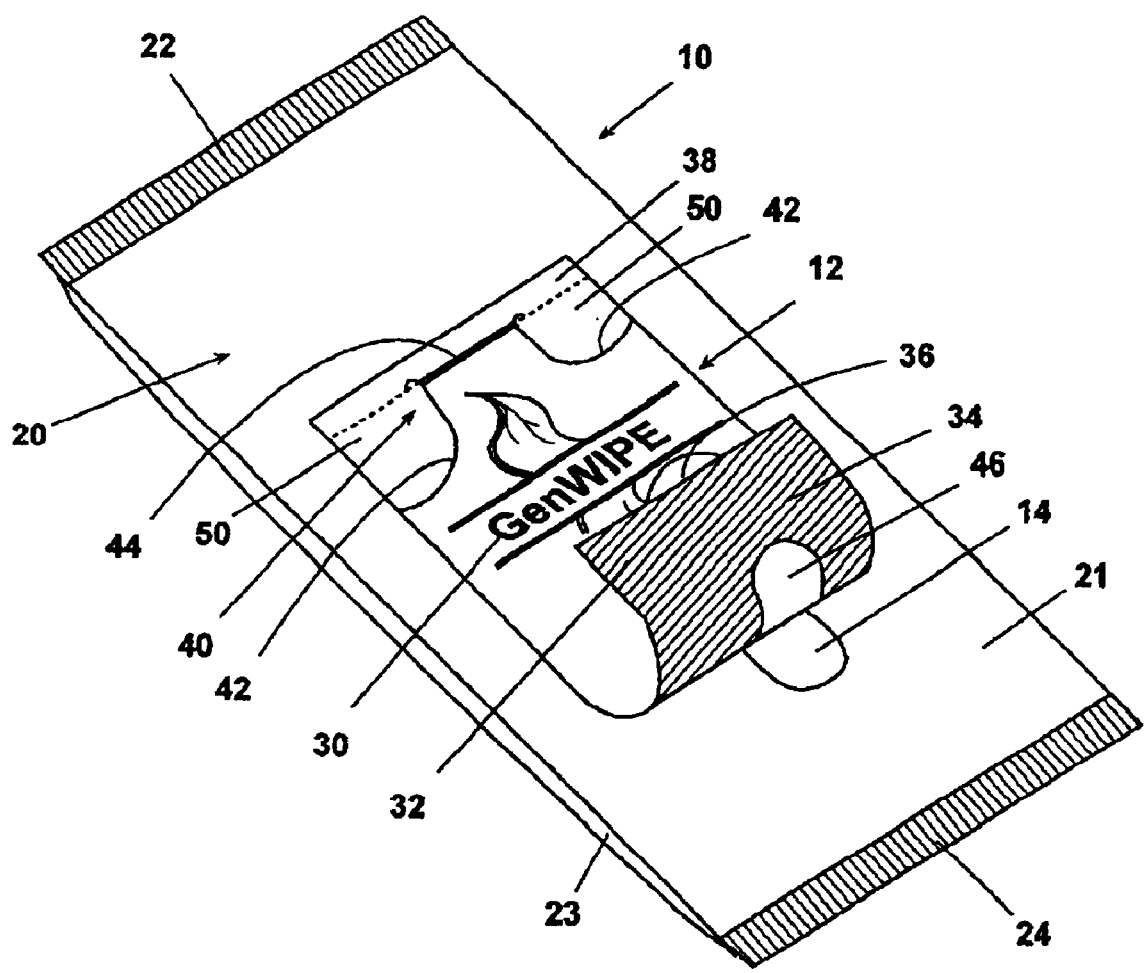
FIG. 1 is a perspective view of a package with a releasable label according to the invention.
Figure 4:
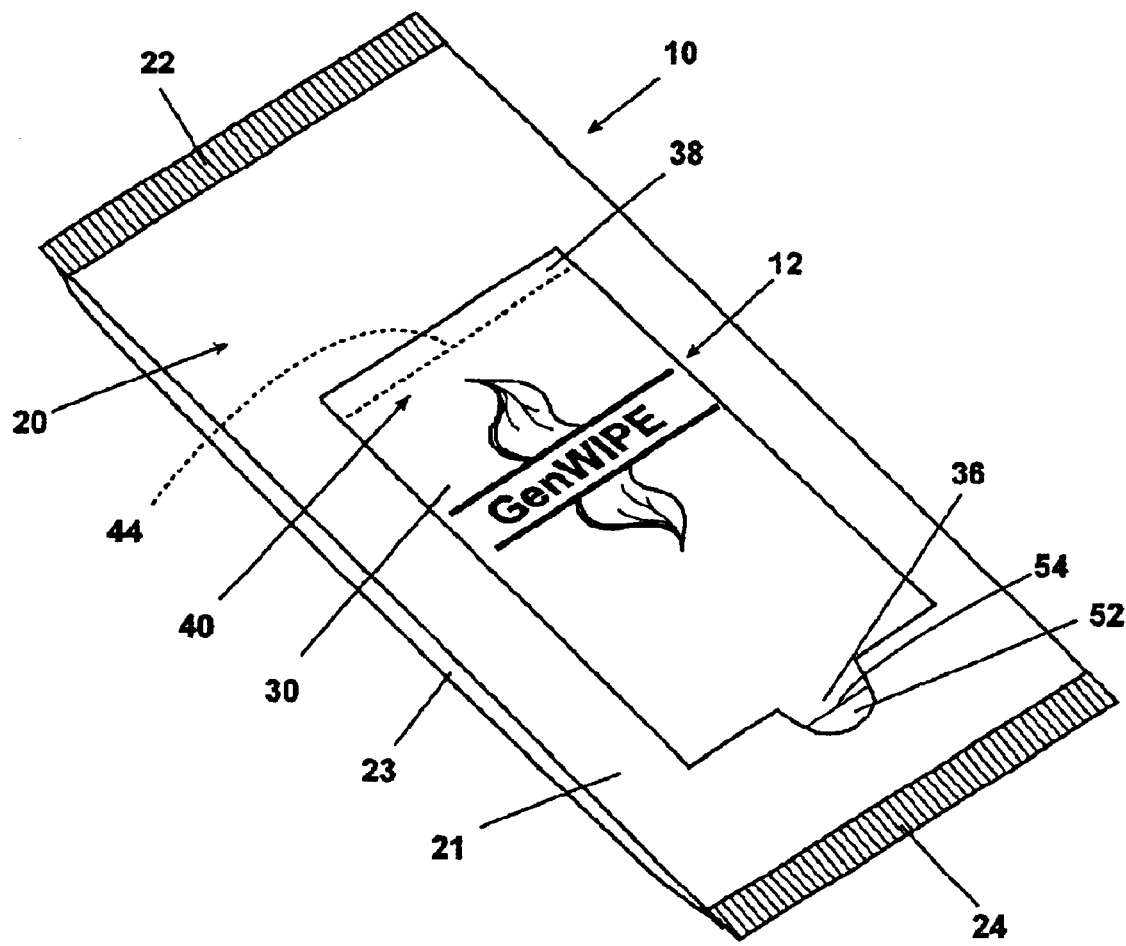
FIG. 4 is a perspective view of a package with a releasable label according to a second embodiment of the invention.

Referring now to FIGS. 1 and 4, an embodiment of the invention is shown comprising a tubular package 10 with an attached releasable label 12 adapted to cover an opening 14 in the package 10. The package 10 is a conventional flexible tubular package well-known in the art for containing disposable cleansing cloths, tissues, and similar products. The products are removed through the opening 14 which is formed as hereinafter described.

Figure 2:
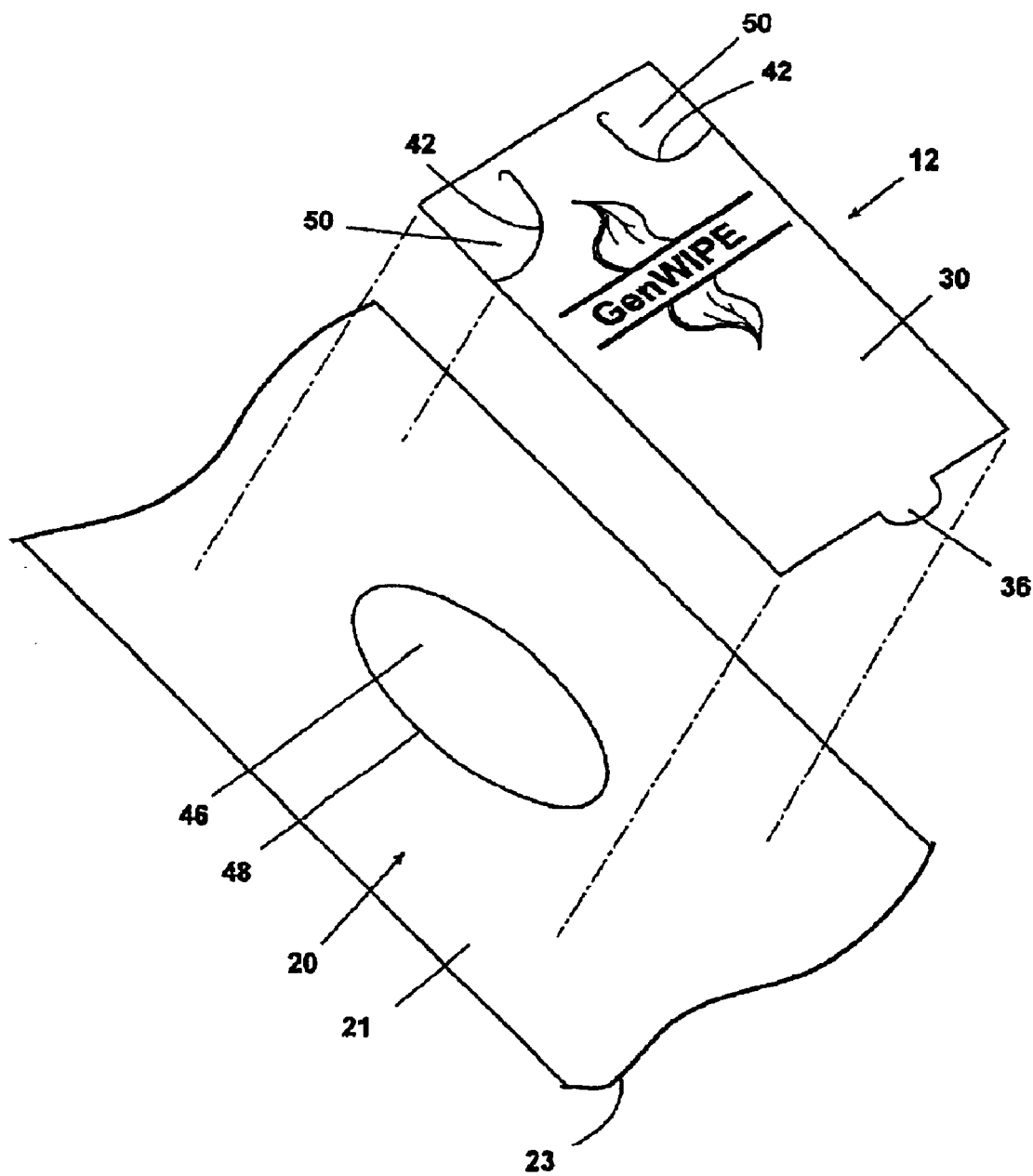
FIG. 2 is a perspective view of a portion of a packaging film for manufacturing the package of FIG. 1 showing a die-cut opening and a releasable label to be applied thereto.

Referring to FIGS. 1, 2 and 4, in the preferred embodiment, the package 10 comprises a laminated, liquid-impervious thin film 20, having an upper ply 21 and a lower ply 23. The film 20 can be a polyethylene-backed aluminum foil laminated to a layer comprising a heat-sealable material such as polytetrafluoroethylene. An example of a suitable film 20 is DuPont SURLYN. The film 20 is formed into a tubular envelope by heat sealing the longitudinal edges (not shown) of the film and heat sealing the end portions 22, 24. The package 10 is formed by folding the film 20 along a longitudinal axis to bring adjacent side edge portions of the film 20 together and sealing the edges together to form a tubular body. The tubular film is cut to lengths and filled with product. Heat and pressure are then applied to the end portions 22, 24 to bond the two plies 21 and 23 together and thereby seal the package.

The opening 14 is formed by perforating or partially die-cutting the desired opening shape in the film 20 along a punch line 48 to define a removable shield 46. Preferably, the punch line 48 only partially penetrates the film 20 so that the shield 46 remains attached to the film 20 to be later removed as hereinafter described. The label 12 is attached to the film 20 over the opening 14 prior to assembly of the film 20 into the final package 10.

The cover label 12 comprises a flexible, liquid-impervious thin film suitable for heat sealing to the upper ply 21 of the film material 20 to cover the opening 14. A SURLYN film can also be used for the cover label 12. The label 12 has a pull tab 36 at a first end and a heat-sealing edge 38 at a second, opposed end. If SURLYN film is used for the upper ply 21, it can be laminated with a layer of thermoplastic material so that the cover label 12 can be heat sealed to the upper ply 21 of the film 20 at least at the area at which the label 12 is heat sealed to the upper ply 21. Thus, it may be necessary to provide the heat-sealing apparatus for the end portions 22, 24 with a release material so that the heat-sealing apparatus can be readily separated from the upper ply 21 after completion of the heat-sealing process applied to the end portions 22, 24. Alternatively, other materials and/or processes can be utilized for permanently sealing the label 12 to the upper ply 21 in order to mitigate any problems associated with heat sealing the label 12 to the upper ply 21 and the end portions 22, 24 together.

In a preferred embodiment, shown in FIG. 4, the label 12 is provided with a mechanical hinge 40 extending the full width of the label 12 along the heat-sealing edge 38. In an alternative embodiment, shown in FIG. 1, the label 12 is die cut along cut lines 42, defining a mechanical hinge 40 comprising tabs 50 and a hinge line 44 along the heat-sealing edge 38. The label has a visible side 30 and an adhesive side 32. The visible side 30 is adapted to be imprinted with graphical or textual information about the product. The adhesive side 32 includes a releasable adhesive 34 that enables the label 12 to be repeatedly peeled from the package 10 and reapplied thereto. The releasable adhesive 34 is applied generally to the adhesive side 32. However, in the preferred embodiment, the releasable adhesive 34 is not applied to the pull tab 36, thereby leaving the pull tab 36 free of the package 10 to be grasped by a user. Further, the releasable adhesive 34 is not applied to the heat-sealing edge 38.

The label 12 with applied adhesive 34 is permanently attached to the package 10 over the opening 14 by heat-sealing the label 10 to the package 20 along the heat-sealing edge 38 adjacent to the opening 14. The first time the label 12 is removed to open the package 10, the shield 46 will be separated from the upper ply 21 up to the heat-sealing edge 38. It will be obvious to one skilled in the art that separation of the shield 46 from the film 20 will be accomplished only if the adhesion of the shield 46 to the label 12 is great enough to overcome the attachment of the shield 46 to the film 20. The label 12 can be progressively removed from the package 10 up to the hinge line 44 and will separate along the cut lines 42, leaving the tabs 50 attached to the package 10. The heat-sealing edge 38 will prevent any further removal of the label 12. The label 12 can be resealed over the opening 14, and the shield 46 will prevent contact between the adhesive 34 and the product.

Figure 3:
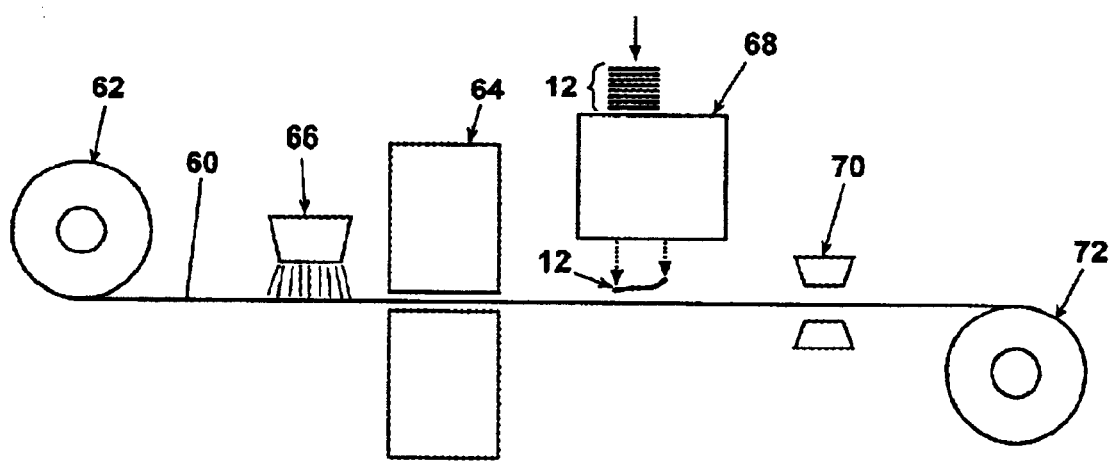
FIG. 3 is a schematic representation of a package and label manufacturing process according to the invention.

The process and apparatus for manufacturing the package will now be described. Referring to FIG. 3, a web 60 of preprinted film is fed from a supply roll 62 through a registration station 66 which registers the location of a preprinted mark on the film relative to a die-cutting station 64 and a label application station 68 for accurate die cutting and placement of the label 12. The web 60 then passes through the die-cutting station 64 where the punch line 48 for the shield 46 is formed. The web 60 next passes through the label application station 68 where the label 12 is applied to the web 60. The label 12 can also be imprinted on the visible side 30 and provided with the releasable adhesive 34 on the adhesive side 32 at the label application station 68. The web 60 with the attached label 12 then passes through a heat-sealing station 70 at which the label 12 is heat sealed to the film 20 along the heat-sealing edge 38. The web 60 is then fed onto a take-up roll 72 for later separation and assembly into individual packages. Alternately, rather than forming packages from the web 60, the web 60 can be separated into individual portions having a punch line 48 and an associated label 12 for later attachment to rigid containers, such as cardboard boxes for disposable tissues, in order to provide a resealable opening for access to the contents of the box.

It will be understood by one skilled in the art that the described process is generally continuous, and that the die-cutting and label-attachment steps can be performed for a plurality of labels applied to a continuous web of film comprising a plurality of die-cut openings. The package manufacturing process can be integrated into a package-filling operation in which the packages are die cut, filled, and then heat sealed. The process can be intermittent or continuous, depending on the nature of the equipment used. For example, the process can be continuous when a rotary die is used and intermittent when a reciprocating die is used. Both types of die-cutting equipment are well known.

Figure 5:
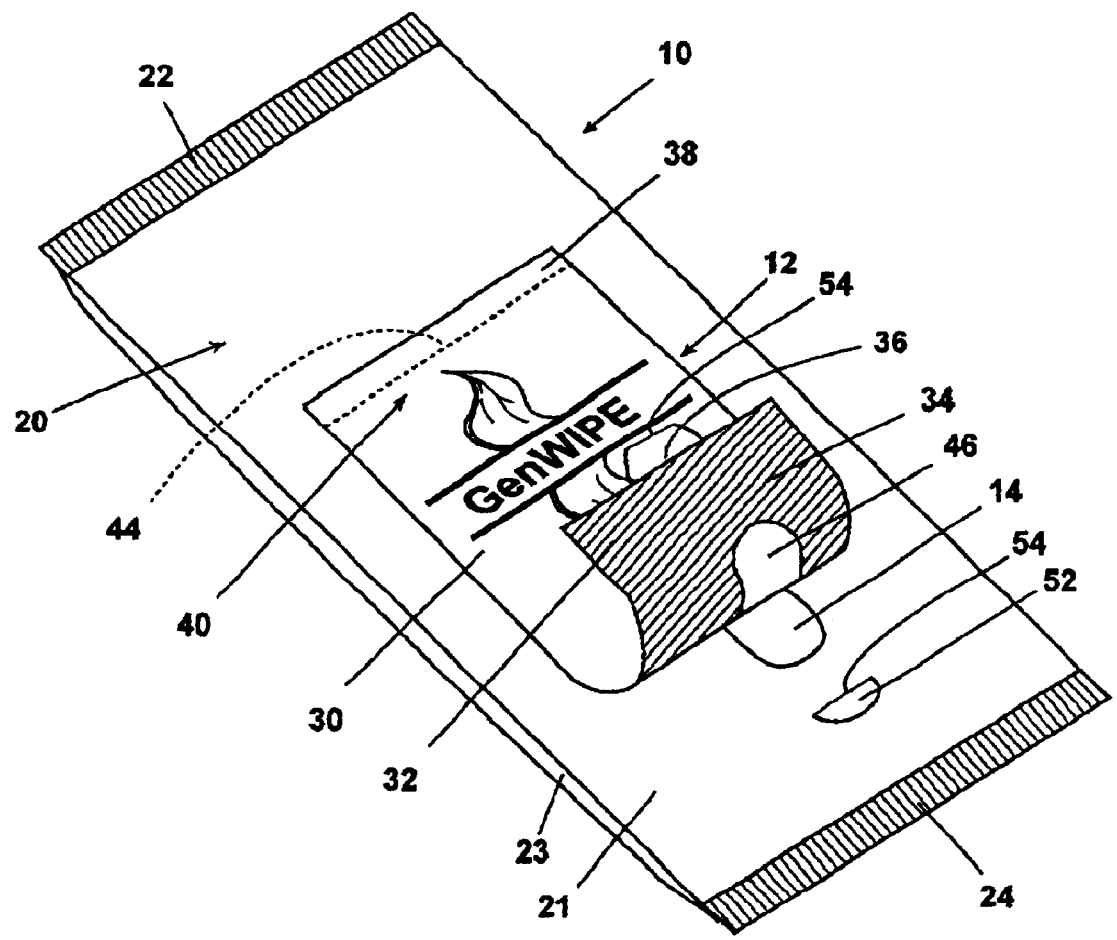
FIG. 5 is a view of the embodiment shown in FIG. 4 with the releasable label partially peeled back.

Referring now to FIGS. 4 and 5, where like numerals are used to designate like parts, the pull tab 36 has a perforated line 54 which separates an end portion 52 from the remainder of the pull tab 36. The end portion 52 of the pull tab 36 is heat sealed or otherwise permanently affixed to the film 20 so that the pull tab 36 must be separated from the end portion 52 at the perforated line 54 in order to peel back the releasable adhesive portion of the label 12 from the film 20. Thus, the label 20 provides a tamper-evident closure through the tab 36 and the heat-sealed or otherwise permanently attached end portion 52.

The invention has been described with respect to heat sealing a portion 38 of the label 12 to the film 20 and heat sealing the end portion 52 of the pull tab 36 to the film. Whereas heat sealing of one or both of these areas of the label 12 is preferred, other forms of permanently securing the label 12 to the film 20 are possible within the scope of certain embodiments of the invention. For example, in lieu of heat sealing, other means of making the hinge 40 permanent, including microencapsulation of a catalyst to permanently affix the label 12 to the film 20 can be employed.

The process illustrated in FIG. 3 can be incorporated into a production line wherein the packages are actually filled with product and sealed. Thus, the package-making process can incorporate the process illustrated in FIG. 3 and can further include the steps of filling the packages and forming the packages.

While the invention has been specifically described in connection with certain specific embodiments thereof, it is to be understood that this is by way of illustration and not of limitation, and the scope of the appended claims should be construed as broadly as the prior art will permit.

What is claimed is:

1. A film assembly comprising:

an at least partially die-cut opening;

a label attached to the film for alternatively covering and uncovering the at least partially die-cut opening, the label having a releasable adhesive on the underside of a peel portion of the film that covers the at least partially die-cut opening for releasably sealing the label over the at least partially die-cut opening;

wherein the label is irremovably attached to the film adjacent to the at least partially die-cut opening through a heat seal at one edge portion of the label adjacent to the at least partially die-cut opening; and a pull tab mounted to the label peel portion distal from the one edge portion to facilitate peeling back the label from the film to expose the opening;

wherein the pull tab has a perforation or other weakened portion that divides the tab into a pull portion adjacent the peel portion of the label and a tamper-evident portion remote from the peel portion of the label and wherein the tamper-evident portion of the pull tab is more permanently attached to the film and separates from the pull portion when the distal end of the label is first peeled back from the film.

2. A film assembly according to claim 1 wherein the label further comprises at least one cut line defining a mechanical hinge along the one edge portion.

3. A film assembly according to claim 2 wherein the at least one cut line defines at least one tab and a hinge line.

4. A film assembly according to claim 3 wherein the at least one tab is heat sealed, or otherwise permanently affixed, to the film.

5. A film assembly according to claim 1 wherein the film comprises a continuous web with multiple of the at least partially die-cut openings and one of the labels is attached to the continuous web adjacent to each of the at least partially die-cut openings for alternatively covering and uncovering the at least partially die-cut openings.

6. A film assembly comprising:

an at least partially die-cut opening;

a label attached to the film for alternatively covering and uncovering the at least partially die-cut opening, the label having a releasable adhesive on the underside of a peel portion of the film that covers the at least partially die-cut opening for releasably sealing the label over the at least partially die-cut opening;

wherein the label is irremovably attached to the film adjacent to the at least partially die-cut opening through a heat seal at one edge portion of the label adjacent to the at least partially die-cut opening; and wherein the film comprises a polyethylene-backed aluminum foil laminated to at least one layer of polytetrafluoroethylene.

7. A film assembly according to claim 6 wherein the label further comprises at least one cut line defining a mechanical hinge along the one edge portion.

8. A film assembly according to claim 7 wherein the at least one cut line defines at least one tab and a hinge line.

9. A film assembly according to claim 8 wherein the at least one tab is heat sealed, or otherwise permanently affixed, to the film.

10. A film assembly according to claim 6 wherein the film comprises a continuous web with multiple of the at least partially die-cut openings and one of the labels is attached to the continuous web adjacent to each of the at least partially die-cut openings for alternatively covering and uncovering the at least partially die-cut openings.

* * * * *